(12) United States Patent
Taverner et al.

(10) Patent No.: US 7,173,696 B2
(45) Date of Patent: Feb. 6, 2007

(54) POLARIZATION MITIGATION TECHNIQUE

(75) Inventors: Domino Taverner, Delray Beach, FL (US); Trevor MacDougall, Simsbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 544 days.

(21) Appl. No.: 10/672,289

(22) Filed: Sep. 26, 2003

(65) Prior Publication Data
US 2005/0068525 A1 Mar. 31, 2005

(51) Int. Cl.
*G01J 3/28* (2006.01)
(52) U.S. Cl. .................................... 356/327
(58) Field of Classification Search .................... None
See application file for complete search history.

(56) References Cited

U.S. PATENT DOCUMENTS 6,856,400 B1 * 2/2005 Froggatt ..................... 356/477

* cited by examiner

*Primary Examiner*—Tu T. Nguyen
(74) *Attorney, Agent, or Firm*—Patterson & Sheridan, LLP

(57) ABSTRACT

A method and apparatus for mitigating the effects of polarization on wavelength determinations is disclosed. An optical source produces light across an optical spectrum, while a polarization element changes the polarization of the light at a first rate. The resulting light is applied to an optical element that produces a spectral response with a feature of interest from the polarization changed light. The optical element and the polarization element are such that the bandwidth of the feature of interest of the optical element is significantly greater than the first rate. A receiver network produces received signals from the received spectrum; and a data processing unit calculates a wavelength that is insensitive to ripple in the received signal and/or the received signals are low-pass filtered to reduce the ripple resulting from the polarization change.

35 Claims, 5 Drawing Sheets

POLARIZATION MITIGATION TECHNIQUE

BACKGROUND OF THE INVENTION

1. Field of the Invention

This invention relates to measuring spectral responses of optical elements. More particularly, this invention relates to improving spectral response measurements by mitigating polarization dependence.

2. Description of the Related Art

Most optical components produce a spectral response that depends on the polarization of incident light. This is often manifested as a polarization-dependent shift in the wavelength of a spectral characteristic (e.g. a reflection peak wavelength) of an optical component. If the incident light is highly polarized, this polarization dependence can cause significant shifts in the wavelength of the spectral characteristic. In many systems, the polarization of the incident light is varying and unknown. This results in unpredictably varying shifts in the wavelengths of the spectral characteristic.

One of the many optical elements having polarization-dependent shifts in wavelength is the fiber Bragg grating (FBG) element. A fiber Bragg grating (FBG) element is an optical element that is usually formed by photo-induced periodic modulation of the refractive index of an optical fiber's core. An FBG element is highly reflective to light having wavelengths within a narrow bandwidth that is centered at a wavelength that is referred to as the Bragg wavelength. Other wavelengths are passed without reflection. The Bragg wavelength itself is dependent on physical parameters, such as temperature and strain, that impact on the refractive index. Therefore, FBG elements can be used as sensors to measure such parameters. After proper calibration, the Bragg wavelength is an absolute measure of the physical parameters.

FBG sensors typically include a tunable laser that interrogates an FBG element by sweeping across an optical spectrum that includes that Bragg wavelength. Alternatively, a broadband light source/tunable filter combination can be used. The sweeping light generates reflections from the FBG element that produce a spectral response of intensity verses wavelength. Since the spectral response peaks correspond to the Bragg wavelengths of the FBG element, by determining the changes in response peaks produced by the physical parameter of interest that parameter can be measured.

Unfortunately, in FBG sensors, the polarization-dependent wavelength shift can limit the achievable measurement accuracy and resolution. This is because the spectral response peaks change not only because of the physical parameter of interest, but also because of polarization induced wavelength shifts.

That polarization-dependent wavelength shifts can impact measurements is known, see reference Vines, Lasse, "Polarization Dependence in CHESS Fiber Optic Strain Monitoring System Based on Fiber Bragg Gratings", Norwegian Defense Research Establishment doc #: FFI/RAPPORT-2002/03348, ISBN-82-464-0645-0. That reference describes attempts at mitigating the polarization problem by depolarizing the source radiation. However, when using narrow-bandwidth sources this puts stringent requirements on the depolarizer design, often beyond what is practically achievable.

Therefore, a new method and apparatus of compensating for polarization-dependent wavelength shifts would be beneficial.

SUMMARY OF THE INVENTION

The principles of the present invention enable compensation of polarization-dependent wavelength shifts in optical filter elements.

A polarization mitigated measurement apparatus that is in accord with the present invention includes an optical source that scans across an optical spectrum. That optical source is applied to a polarization element that changes the polarization of the output light. The output of the polarization element is applied to an optical filter element that is subject to polarization-dependent wavelength shifts. The bandwidth of the optical filter element is significantly greater than the rate of change of the polarization of the polarization element. The optical filter element produces a spectral response with an unknown polarization-induced wavelength-shift transformation. A spectral measurement network measures that spectral response and produces a received signal across the optical spectrum. A data processing unit then calculates a filter wavelength that is insensitive to the polarization-induced variations in the received signal across the bandwidth of the optical filter element. That calculated filter wavelength is subsequently used to characterize the optical filter element.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF ILLUSTRATED EMBODIMENTS

Figure 1:
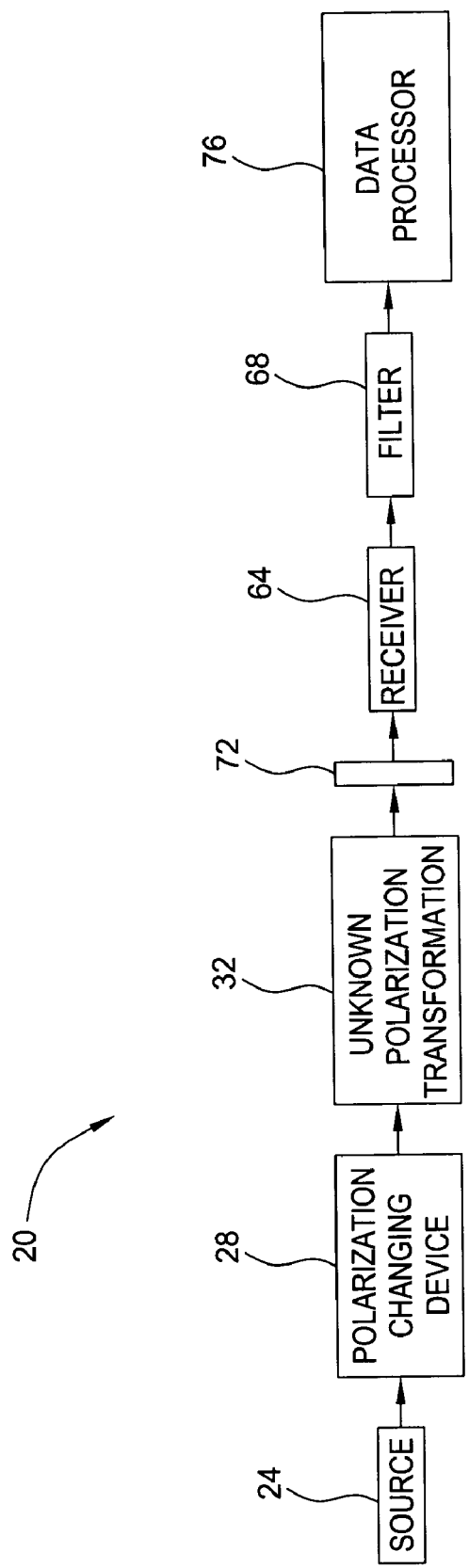
FIG. 1 schematically illustrates an optical system that incorporates the principles of the present invention.

Referring now to FIG. 1, a polarization mitigated apparatus 20 that is in accord with the present invention includes an optical source 24 that scans across an optical spectrum. The optical source 24 is coupled to a polarization changing device 28 that changes the polarization of the optical radiation (light) in a particular manner that is described subsequently. The output of the polarization changing device 28 is applied to an optical element 32 that produces an unknown and/or varying polarization transformation on the optical radiation. The optical radiation (light) is then applied to an optical element 72 having a polarization dependent wavelength response. The response of element 72 has some spectral feature, or spectral features, of interest within the optical spectrum produced by the optical source 24. The optical elements 32 and 72 may also comprise a single element having the same functionality as described above.

The spectral bandwidth of the optical feature of interest in the optical element 72 is significantly greater than that of those induced by the change of the polarization in the polarization changing device 28. That is, the polarization changing device 28 changes polarity quickly: such a quick change corresponds to a narrow spectral bandwidth.

Figure 2:
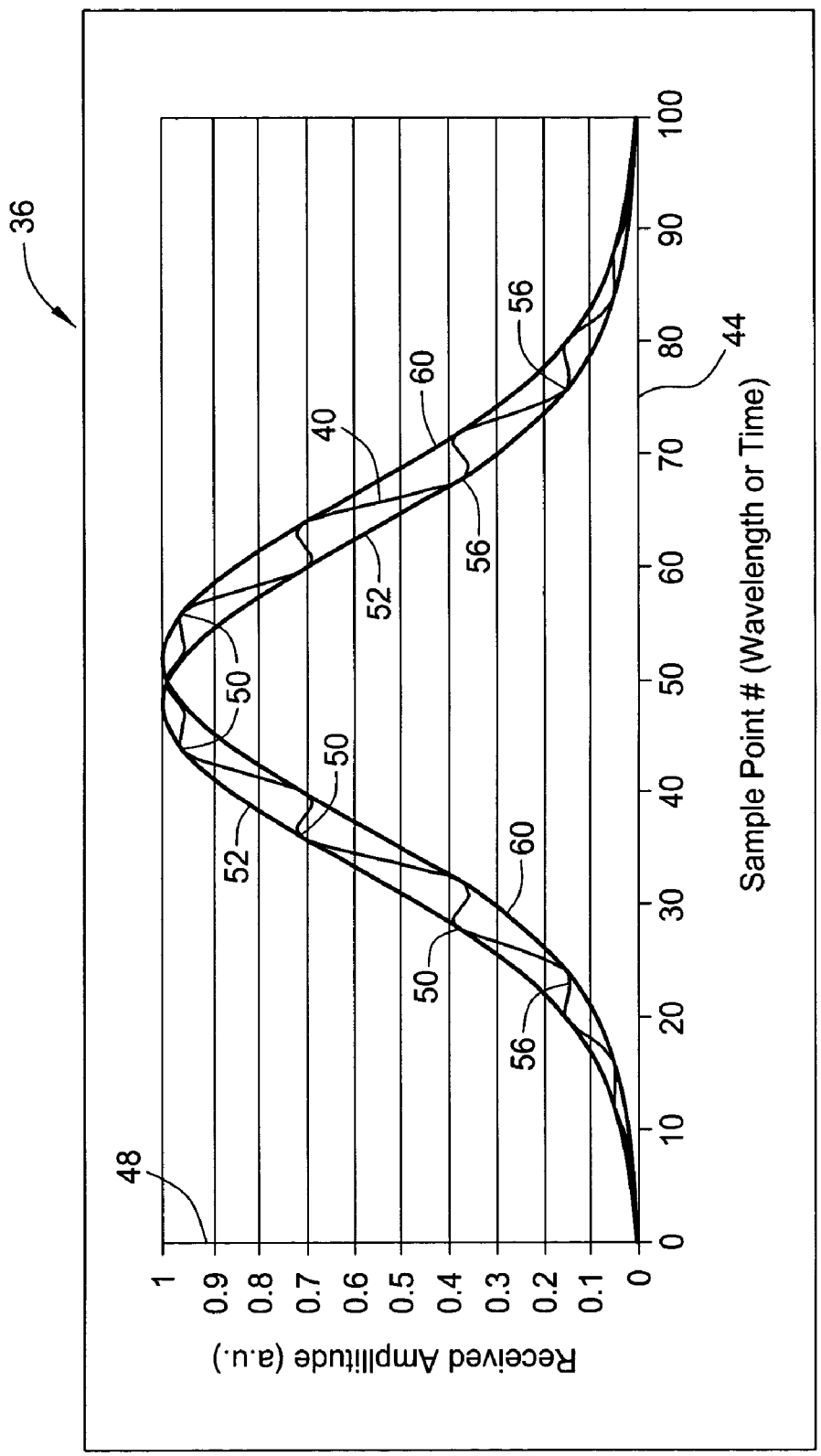
FIG. 2 illustrates both the spectral response and its dependence on polarization of an FBG sensor.

FIG. 2 is an exemplary diagram 36 of the spectral response of the optical element 72 to light from the system described above. The polarization dependency of the optical element 72 results in a spectral waveform 40 of wavelength (in the X-axis 44) against normalized amplitude (in the Y-axis 48). Curves 52 and 60 represent the spectral response of the feature of interest of element 72 for incident radiation on each of two orthogonal polarization axes. Waveform 40 represents the response of the feature of interest (Bragg wavelength) as a mixing of the two orthogonal polarization responses 52 and 60 due to the polarization changing device 28. The diagram 36 might be a plot of transmission through the optical element 72 or reflections from the optical element 72.

In any event, the light from the optical element 72 is detected and converted into electrical signals—by a receiver 64. The output of the receiver 64 is applied through an optional low pass filter 68 (whose purpose is described subsequently) to a data processor 76 that derives a parameter of interest, e.g., a Bragg wavelength, from the receiver output. A further, alternative arrangement is for a low pass filter to be an integral part of the receiver 64.

Figure 3:
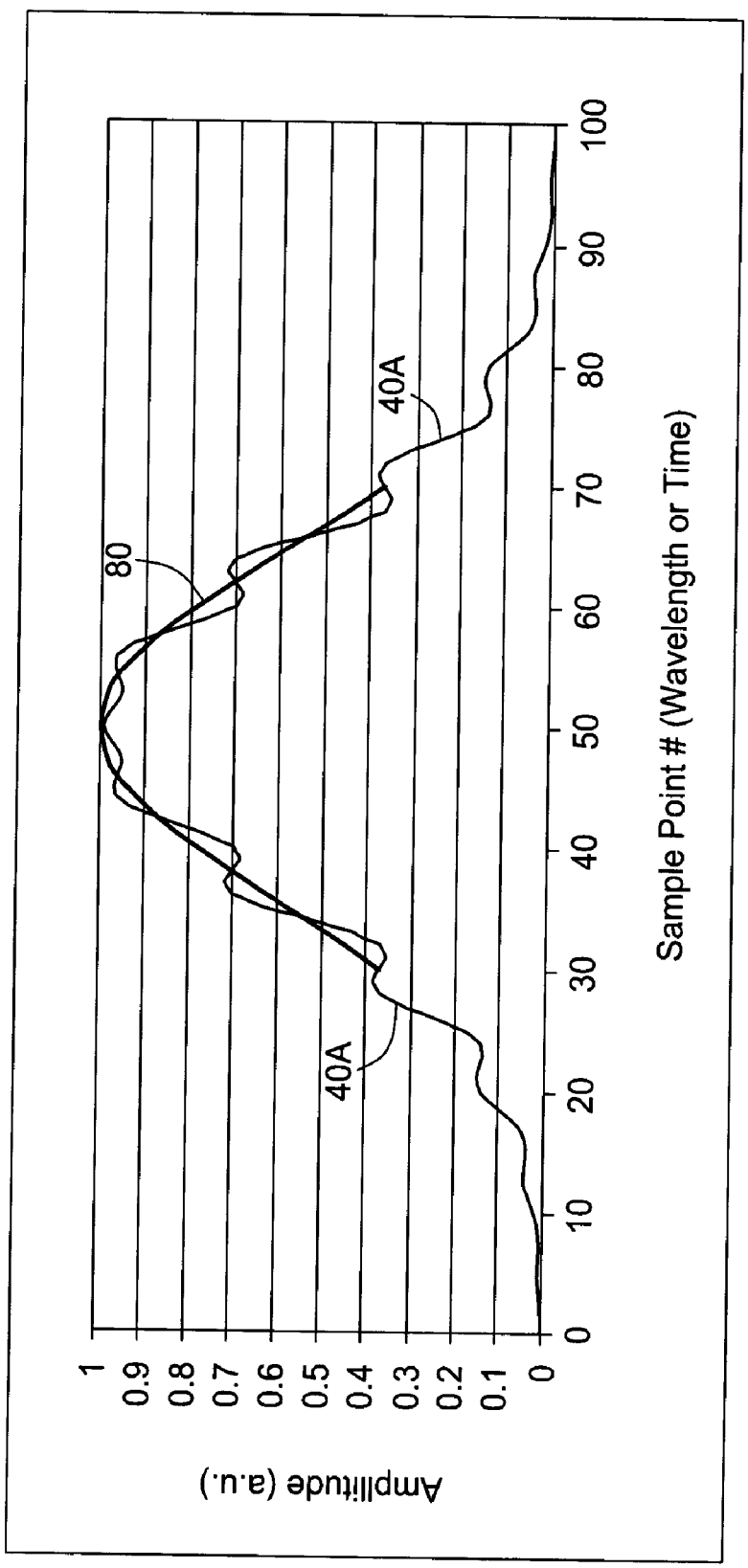
FIG. 3 illustrates the use of a low-order (2nd) polynomial curve fit to produce a measurement insensitive to polarization-induced variations.

The receiver 64 produces electrical signals that correspond to the spectral waveform 40. Thus, the waveform 40 also represents electrical signals. In some embodiments of the present invention the data processor 76 uses a noise insensitive peak detection method to characterize the wavelength of the spectral feature 40. Wherein such noise may be randomly produced or produced from a systematic source. An example of such a technique in shown in FIG. 3 wherein the spectral feature 40A is being characterized. As shown, a quadratic curve 80 has been fit to the measured signal 40A with a least-square error minimization technique. Examples of other suitable peak detection schemes include: center of mass/centroid calculations, a fit of a polynomial curve, a Gaussian curve, a Lorentzian curve, various power sine/cosine or other trigonometric function curves, etc. Other curve fit methods may also be used. Regardless of the specific method used, in certain embodiments it is advantageous that the calculation of the wavelength corresponding to the spectral feature is insensitive noise or variation at a frequency greater than the bandwith of the spectral feature of interest.

Figure 4:
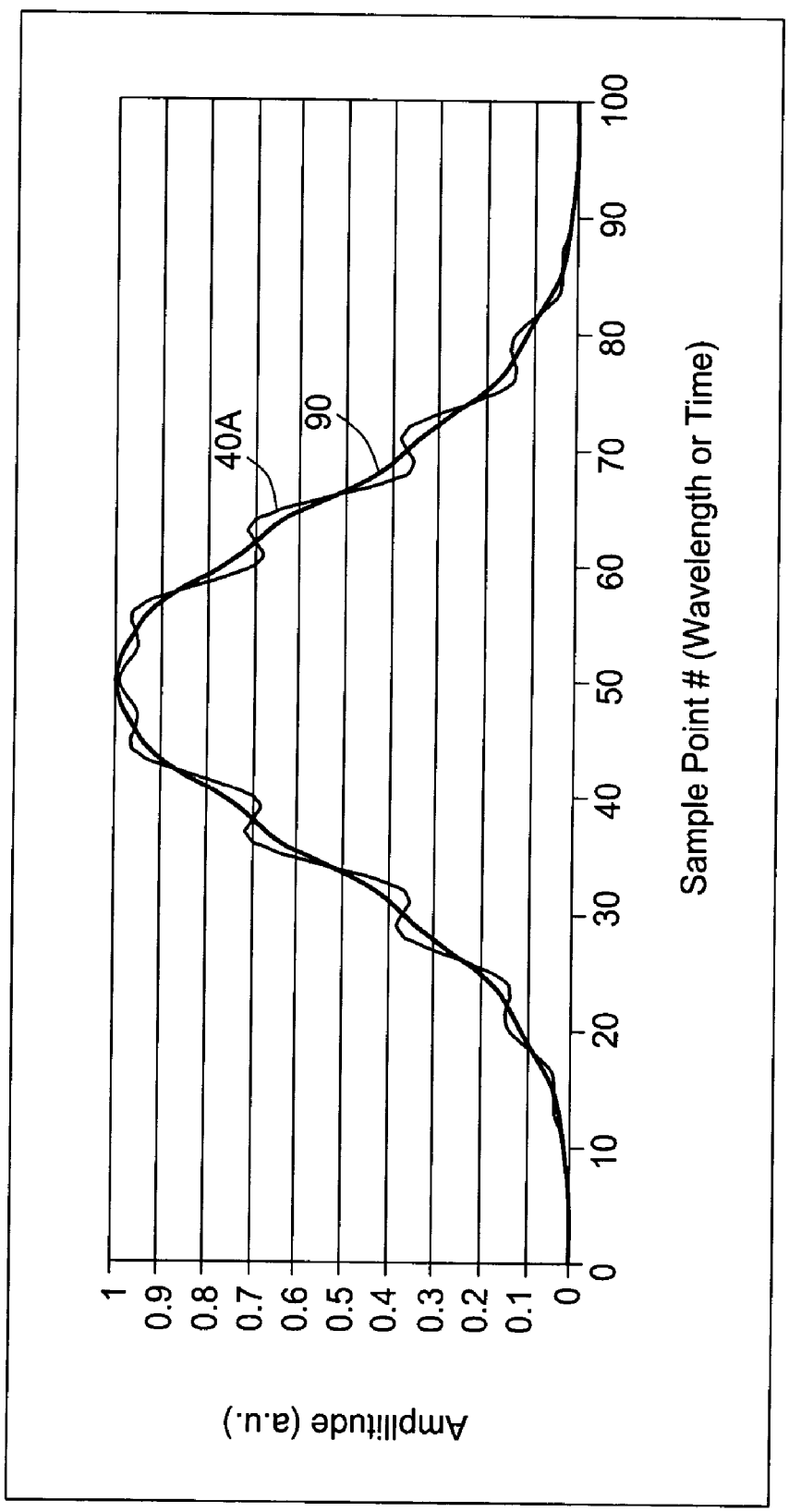
FIG. 4 illustrates the spectral response of FIG. 2 both before and after that response is filtered.

Another approach to improving peak detection is to incorporate the optional low-pass filter 68. That low-pass filter should have a cut-off frequency that filters the higher frequency ripple content from the electrical signal 40. This is shown, in FIG. 4, wherein the electrical waveform 40A is smoothed by filtering to produce the waveform 90, which has reduced peaks and valleys.

This filtering could be analogue or digital, finite impulse response or infinite impulse response, or any combination of these.

Is should be understood that a low pass filter, noise insensitive peak detection techniques, or both can be used.

Thus, low pass filtering and noise insensitive peak detection techniques are complementary rather than mutually exclusive.

Turning back to FIG. 1, the optical source 24 could be any of a number of devices such as a tunable laser or a combination of a broadband light source and a tunable filter. The polarization changing device 28 can be a depolarizer or a polarization scrambler, either active or passive. It could also be integrated into the source 24, or even be an inherent property of the source 24. Commonly used passive depolarizers include wedge depolarizers, cascaded feed-back loop depolarizers and Lyot depolarizers. Commonly used polarization scramblers include Lithium Niobate, resonant coil or fiber squeezer based devices.

The optical element 32 that produces the unknown polarization transformation can be any of a wide range of optical elements. Indeed, most optical elements show polarization dependence in their transmission or reflection spectral responses. An example of such an optical element is the fiber optic cable. Not only do fiber optic cables show polarization dependence, but fiber optic cables can incorporate fiber Bragg grating elements that also exhibit polarization dependence. As previously noted, fiber Bragg grating elements can be used in FBG sensor systems.

Figure 5:
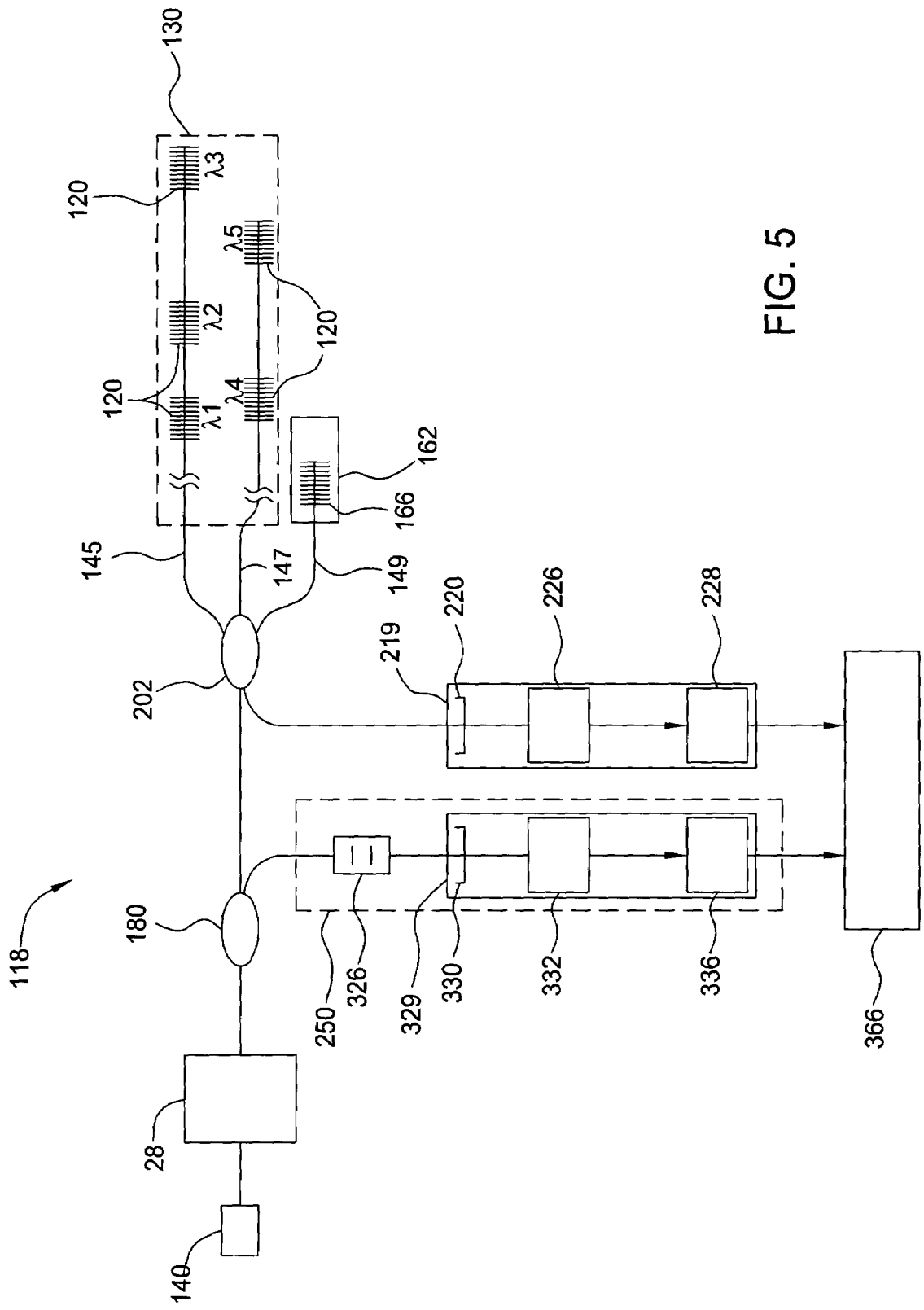
FIG. 5 schematically illustrates an FBG sensor system that incorporates the principles of the present invention.

FIG. 5 illustrates a specific embodiment of the invention, specifically an FBG sensor system 118 having FBG elements 120 within an FBG sensor array 130. As shown, the FBG sensor array 130 may be comprised of one or more optical fibers 145 and 147. The individual FBG elements 120 have Bragg wavelengths $\lambda 1$ through $\lambda 5$. As noted, Bragg wavelengths are dependent upon physical parameters such as temperature and pressure, and thus changes in wavelengths $\lambda 1$–$\lambda 5$ can be made indicative of parameters being sensed.

Unfortunately, measurement errors caused by polarization shifts in the optical fibers and other optical elements can reduce the accuracy.

The FBG sensor system 118 is suitable for measuring pressure and temperature in hostile environments such as occurs in oil wells. To provide a reference wavelength the FBG sensor system 118 includes an optical fiber 149 having a reference FBG element 160 that is physically and thermally protected by an enclosure 162. The reference FBG element 160 is comprised of a fiber Bragg grating 166 that is induced in the core of the optical fiber 149. When light is applied to the reference FBG element 160 reflections of light at Bragg wavelengths are produced. The enclosure 162 protects the reference FBG element 160 such that its Bragg wavelengths are not susceptible to external influences and thus are accurately known. Alternatively, a thermometer could be used to determine the temperature of the reference FBG element 160. Then, based on the measured temperature the Bragg wavelengths of the FBG element 160 could be temperature compensated. Either way, the reference FBG element 160 produces Bragg wavelengths that are accurately known and that can be used to process other Bragg wavelengths. Any measurement error in the Bragg wavelength of the reference FBG element 160 caused by polarization shifts in the optical fiber 149 or in other optical elements will reduce the accuracy of all of the Bragg wavelength measurements.

The FBG sensor system 118 further includes a tuned laser 140 that is scanned across the Bragg wavelengths of the FBG elements 120 and of the reference FBG element 160. The tuned laser 140 corresponds to the source 24 of FIG. 1. The narrow bandwidth scanning light is applied to a polarization changing device 28 (also see FIG. 1 and the foregoing description of the polarization changing device 28), which generically represents polarization changes induced by the tuned laser 140 and by the optical transmission path. Other optical elements, including the optical fibers 145, 147, and 149, can also induce polarization changes.

The output of the polarization changing device 28 is split by a fiber optic directional coupler 180. The main portion of that light is coupled to the FBG sensor array 130 and to the reference FBG element 160 via a second directional coupler 202. Reflected light from the FBG sensor array 130 and from the FBG element 160, which occur when the wavelength of the narrow bandwidth scanning light sweeps across the Bragg wavelength of an FBG element 120 or of the reference FBG element 160, passes back into the directional coupler 202 and into a sensor receiver network 219. That receiver includes a sensor detector 220 that converts the Bragg wavelength reflections into sensor electrical signals having amplitudes that depend on the power (intensity) of the reflected light. Thus, the sensor detector 220 acts as a power meter.

The output of the sensor detector 220 is applied to a sensor electrical filter 226 (which corresponds to the filter 68 of FIG. 1), which is part of the sensor receiver 219. The sensor electrical filter 226 low-pass filters the sensor electrical signals to reduce the polarization dependent portions of the electrical signals. The polarization dependent portions can be caused by polarization changes induced by the polarization changing device 28 and by the optical fibers 145, 147, or 149.

The output of the sensor electrical filter 226 is applied to a sensor amplifier 228, which is also part of the sensor receiver 219. The sensor amplifier 228 amplifies the output of the sensor electrical filter 226. Alternatively, the sensor amplifier 228 could come before the sensor electrical filter 226, or sensor electrical filters 226 can be placed both before and after the sensor amplifier 228.

A portion of the light from the fiber optic directional coupler 180 is directed along a reference arm 250 having an interference filter 326, which is, for example, a fixed cavity F-P fiber filter. The interference filter 326 produces a reference spectrum having spectrum peaks with a constant, known frequency separation that depends on the interference filter 326. The reference spectrum is coupled to a reference receiver 329. The reference receiver 329 includes a reference detector 330 that produces a reference electrical pulse train that corresponds to the output of the interference filter 326. The output of the reference detector 330 is filtered by a reference filter 332, which is part of the reference receiver 329. The reference filter 332 low pass filters the reference electrical signals to reduce the polarization dependent portions of the electrical signals. The output of the reference filter 332 is applied to a reference amplifier 336, which is also part of the reference receiver 329, and which amplifies the output of the reference filter 332. Alternatively, the reference amplifier 336 could come before the reference filter 332.

Once the wavelength of one of the reference spectrum peaks is known, because of the constant frequency separation produced by the interference filter 326 all of the wavelengths of the peaks can be determined. Then, by comparing the Bragg wavelengths of the FBG elements 120 to the wavelengths of the reference spectrum peaks the Bragg wavelengths of the FBG elements can be accurately determined. Furthermore, since the unstressed Bragg wavelengths of the FBG elements 120 are known, the wavelength change in each FBG element's Bragg wavelength can be used to determine a physical parameter of interest.

To that end, the electrical signals from the sensor receiver 219 and from the reference receiver 329 are sequentially sampled, processed and compared in a signal processing and data presentation unit 366 to produce such measurements. That unit interrogates the reference electrical signals to isolate the responses from the reference FBG element 160 (which are different than the wavelengths $\lambda 1$ through $\lambda 5$). Those responses are then processed as is described below to produce a characteristic wavelength of the reference FBG element 160. That characteristic wavelength is then used to identify at least one reference peak, which together with the known reference peak spacing, are used as to determine the Bragg wavelengths $\lambda 1$ through $\lambda 5$.

A key to accurately determining Bragg wavelengths $\lambda 1$ through $\lambda 5$ is accurately determining the characteristic Bragg wavelength of the reference FBG element 160. To determine that Bragg wavelength the signal processing and data presentation unit 366 performs a mathematical analysis of the reference electrical signals and of the sensor electrical signals to reduce polarization induced measurement errors. That analysis uses signal processing techniques that are insensitive to and/or that remove unwanted noise and fluctuations in the received signals from both the reference receiver 329 and from the sensor receiver 219. The analysis can include mathematical techniques such as fitting quadratic curves to the electrical signals using a least-square error minimization technique as described above. Of course, other mathematical techniques could be used. Furthermore, the low-pass filtering of the reference electrical signals and of the sensor electrical signals also reduce polarization induced measurement errors. By compensating for polarization induced changes the measurement accuracy can be improved.

While the foregoing is directed to embodiments of the present invention, other and further embodiments of the invention may be devised without departing from the basic scope thereof, and the scope thereof is determined by the claims that follow.

The invention claimed is:

1. A polarization mitigated wavelength determination apparatus comprising:
    an optical source that produces light that sweeps an optical spectrum;
    a polarization element that changes the polarization of the light at a first rate;
    an optical element that produces a spectral response from the polarization changed light, wherein the spectral response includes a spectral feature of interest, and wherein the spectral feature of interest varies according to polarization changes based on the first rate;
    a receiver network in optical communication with the optical element that produces a received signal from the spectral response; and
    a data processing unit that samples the received signal at a sampling rate significantly greater than the first rate and calculates a wavelength corresponding to the spectral feature of interest by compensating for the polarization of the light such that the calculated wavelength is insensitive to polarization-induced variations.

2. The apparatus of claim 1 wherein calculating the wavelength is performed in a manner that is insensitive to noise in the received signal.

3. The apparatus of claim 1, further including an unknown polarization transformation element.

4. The apparatus of claim 1, further including a varying polarization transformation element.

5. The apparatus of claim 1 wherein the optical source includes a tunable laser.

6. The apparatus of claim 1 wherein the optical source includes a broadband light source and a tunable filter.

7. The apparatus of claim 1 wherein the polarization element is a passive depolarizer.

8. The apparatus of claim 7 wherein the passive depolarizer includes a device selected from a group comprised of wedge depolarizers, cascaded feed-back loop depolarizers, and Lyot depolarizers.

9. The apparatus of claim 1 wherein the polarization element is an active depolarizer.

10. The apparatus of claim 9 wherein the active depolarizer is a polarization scrambler.

11. The apparatus of claim 1 wherein the optical element includes a fiber Bragg grating.

12. The apparatus of claim 1 wherein the data processing unit calculates the wavelength using a least-squares fit of a quadratic curve to the received signal.

13. The apparatus of claim 1 wherein the data processing unit calculates the wavelength using a method selected from a group comprising, center of mass calculations, centroid calculations, fitting to a polynomial curve, fitting to a Gaussian curve, fitting to a Lorentzian curve, and fitting to a trigonometric function curve.

14. The apparatus of claim 1 wherein the receiver network includes a photo-detector.

15. The apparatus of claim 1 wherein the receiver network includes a low-pass filter.

16. A wavelength determination apparatus comprising: an optical source that produces light that sweeps across a wavelength range in a first time period;
a polarization element that changes the polarization of the light at a first rate;
an optical element that produces a spectral response from the polarization changed light, wherein the spectral response includes a spectral feature of interest, wherein the optical element produces polarization-dependent wavelength shifts, and wherein the spectral feature of interest varies according to polarization changes based on the first rate;
a receiver network that produces a received signal from the spectral response;
a low-pass filter that filters received signals that correspond to the first time period; and
a data processing unit that samples the filtered received signal at a sampling rate significantly greater than the first rate and calculates a wavelength corresponding to the spectral feature of interest from the filtered received signal by compensating for the polarization of the light such that the calculated wavelength is insensitive to polarization-induced variations.

17. The apparatus of claim 16 wherein the optical source includes a tunable laser.

18. The apparatus of claim 16 wherein the optical source includes a broadband light source and a tunable filter.

19. The apparatus of claim 16 wherein the polarization element is a passive depolarizer.

20. The apparatus of claim 19 wherein the passive depolarizer includes a Lyot depolarizer.

21. The apparatus of claim 16 wherein the polarization element is an active depolarizer.

22. The apparatus of claim 21 wherein the active depolarizer is a polarization scrambler.

23. The apparatus of claim 16 wherein the optical element comprises a fiber Bragg grating.

24. The apparatus of claim 16 wherein the data processing unit calculates the wavelength using a least-squares fit of a quadratic curve.

25. The apparatus of claim 16 wherein the receiver network includes a photo-detector.

26. The apparatus of claim 16 wherein the data processing unit includes a computer.

27. The apparatus of claim 16 wherein the data processing unit performs a curve fit during calculation of the wavelength.

28. The apparatus of claim 27 wherein the curve fit is selected from a group consisting of a quadratic curve, a polynomial curve, a Lorentzian curve, a Gaussian curve, and a trigonometric function curve.

29. The apparatus of claim 16 wherein the data processing unit performs center of mass and/or centroid calculations during calculation of the wavelength.

30. The apparatus of claim 16 wherein the low pass filter includes an analog filter.

31. The apparatus of claim 16 wherein the low pass filter includes a digital filter.

32. A method of compensating for polarization-induced measurement dependency comprising:
sweeping light across an optical spectrum;
changing the polarization of the sweeping light at a first rate to produce changing polarization light;
producing a spectral response of an optical element in response to the changing polarization light, wherein the spectral response has a spectral feature of interest that varies according to polarization changes at the first rate;
converting the spectral response to received signals;
sampling the received signals at a sampling rate significantly greater than the first rate; and
processing the sampled received signals to determine a wavelength that is insensitive to polarization-induced variations and noise at or above the first rate in the received signals.

33. The method of claim 32 wherein processing the received signals includes low-pass filtering the signals.

34. The method of claim 32 wherein processing the received signals includes calculating the wavelength.

35. The method of claim 34 wherein calculating the wavelength includes performing a least-squares fit of a quadratic curve.

* * * * *